US007768636B2

(12) United States Patent
Obara et al.

(10) Patent No.: US 7,768,636 B2
(45) Date of Patent: Aug. 3, 2010

(54) BELT INSPECTING APPARATUS

(75) Inventors: Ryo Obara, Utsunomiya (JP); Hiroki Tahira, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/327,275

(22) Filed: Dec. 3, 2008

(65) Prior Publication Data
US 2009/0147249 A1 Jun. 11, 2009

(30) Foreign Application Priority Data
Dec. 6, 2007 (JP) .............................. 2007-315793
Jun. 4, 2008 (JP) .............................. 2008-146841

(51) Int. Cl.
*G01N 21/00* (2006.01)
(52) U.S. Cl. .................. 356/237.3; 356/237.1
(58) Field of Classification Search ... 356/238.1–238.3, 356/239.7–239.8, 237.1–237.6, 600, 637, 356/243.4; 250/559.4, 559.36, 559.2, 559.06, 250/559.24, 559.22, 222.1–222.2
See application file for complete search history.

(56) References Cited
U.S. PATENT DOCUMENTS
5,724,093 A * 3/1998 Parenti ....................... 348/131

6,566,670 B1 * 5/2003 Buisker et al. ......... 250/559.36
6,847,443 B1 * 1/2005 Herod et al. ............. 356/237.2

FOREIGN PATENT DOCUMENTS

| JP | 2003-270173 | 9/2003 |
|---|---|---|
| JP | 2004-077425 | 3/2004 |
| JP | 2005-162588 | 6/2005 |
| JP | 2006-030067 | 2/2006 |
| JP | 2007-187516 | 7/2007 |
| JP | 2007-199066 | 8/2007 |
| JP | 2007-279064 | 10/2007 |
| JP | 2007-285983 | 11/2007 |

* cited by examiner

*Primary Examiner*—Gregory J Toatley, Jr.
*Assistant Examiner*—Tri T Ton
(74) *Attorney, Agent, or Firm*—Rankin, Hill & Clark LLP

(57) ABSTRACT

A belt inspecting apparatus applies illuminating light beams (R, G, B) through light guides to a flat inner portion, a flat outer portion, flat side portions, and curved portions of a metal belt. The illuminating light beams, which are reflected by the metal belt, are guided through the light guides to color cameras, which detect the illuminating light beams as image information. A surface state decision unit compares the detected image information with normal image information in order to determine whether the metal belt contains flaws therein or not.

10 Claims, 24 Drawing Sheets

BELT INSPECTING APPARATUS

BACKGROUND OF THE INVENTION

1. Field of the Invention

The present invention relates to a belt inspecting apparatus for inspecting the surface state of a belt.

2. Description of the Related Art

Continuously variable transmissions (CVTs) for use in automobiles employ a metal belt assembly as a means for transmitting drive power from the engine to the drive shaft. The metal belt assembly includes a stack of thin metal belts assembled together. The metal belt assembly is required to be flawless in order to smoothly transmit the drive power to the drive shaft without fail.

There has been proposed a belt inspecting apparatus for automatically inspecting a metal belt for flaws (see Japanese Laid-Open Patent Publication No. 2004-077425).

FIGS. 24A through 24C of the accompanying drawings show transverse cross-sectional shapes of thin metal belts. FIG. 24A illustrates a normal profile 200, as indicated by the solid line, representing an appropriate cross-sectional shape of the thin metal belt. FIG. 24B illustrates, in addition to the normal profile 200 indicated by the dotted line, an abnormal profile 202, as indicated by the solid line, representing an inappropriate cross-sectional shape of a thin metal belt, which has an abrasion flaw on a side surface thereof. FIG. 24C illustrates, in addition to the normal profile 200 indicated by the dotted line, an abnormal profile 204, as indicated by the solid line, representing an inappropriate cross-sectional shape of a thin metal belt, which has an impression flaw on a side surface thereof. The belt inspecting apparatus disclosed in Japanese Laid-Open Patent Publication No. 2004-077425 determines deviations of the abnormal profiles 202, 204, shown in FIGS. 24B and 24C, from the normal profile 200 shown in FIG. 24A, and automatically determines whether the metal belts are acceptable or not based on such determined deviations.

When a metal belt is manufactured, dust particles tend to be applied to the metal belt. Although the applied dust particles do not make the metal belt unacceptable as a product, in the above belt inspecting apparatus, it is difficult to distinguish such dust particles from actual flaws on the metal belt. The apparatus therefore is liable to judge the dust particles as producing the abnormal profiles 202 or 204.

In particular, the metal belt comprises a flat portion, and curved portions, which are continuous to opposite edges of the flat portion. The belt inspecting apparatus is more likely to ignore flaws on the curved portions than flaws on the flat portion. In addition, the belt inspecting apparatus is unable to clearly sort out dents from bumps on the metal belts, and hence the apparatus is unable to separate dust particles from actual flaws that are as large as the dust particles.

SUMMARY OF THE INVENTION

It is a general object of the present invention to provide a belt inspecting apparatus, which is capable of inspecting the surface state of a belt highly accurately.

A major object of the present invention is to provide a belt inspecting apparatus, which is capable of easily distinguishing flaws on the surface of a belt from dust particles applied to the belt.

Another object of the present invention is to provide a belt inspecting apparatus, which is capable of detecting flaws on curved side portions of a belt without excessive detection.

Still another object of the present invention is to provide a belt inspecting apparatus, which is simple in structure.

Yet another object of the present invention is to provide a belt inspecting apparatus, which is capable of efficiently inspecting a belt without the need for reinstalling the belt.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
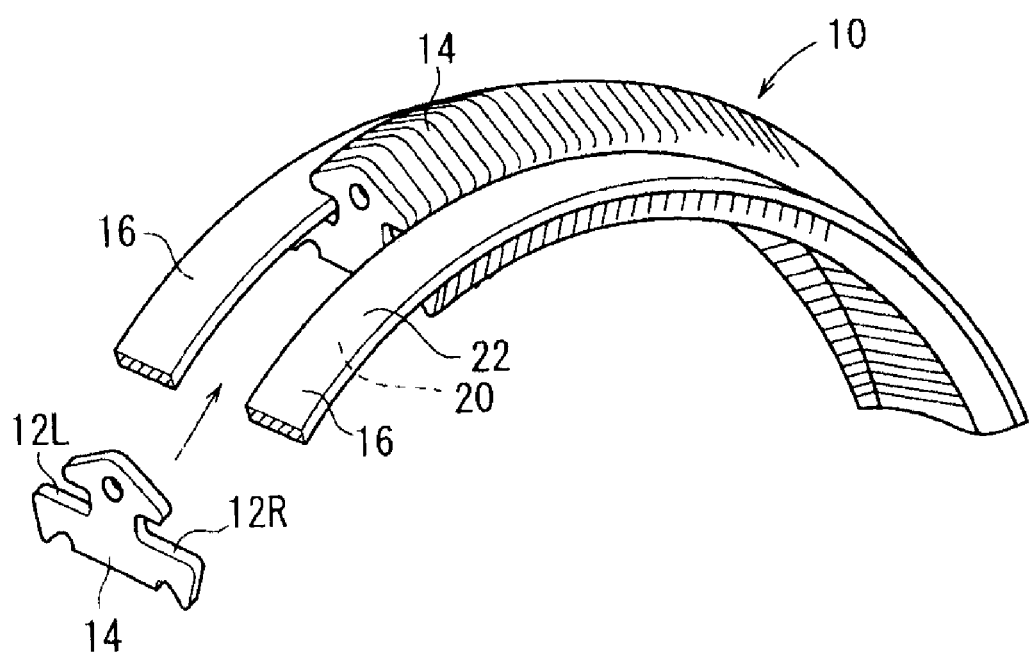
FIG. 1 is a fragmentary perspective view of a metal belt assembly for a CVT, which can be inspected by a belt inspecting apparatus according to the present invention.

FIG. 1 shows a fragmentary perspective view of a metal belt assembly 10 for a CVT, which can be inspected by a belt inspecting apparatus according to the present invention. The metal belt assembly 10 comprises a plurality of elements 14, each having left and right grooves 12L, 12R, and a pair of left and right endless metal belt stacks 16 that engage respectively in the grooves 12L, 12R.

Figure 2:
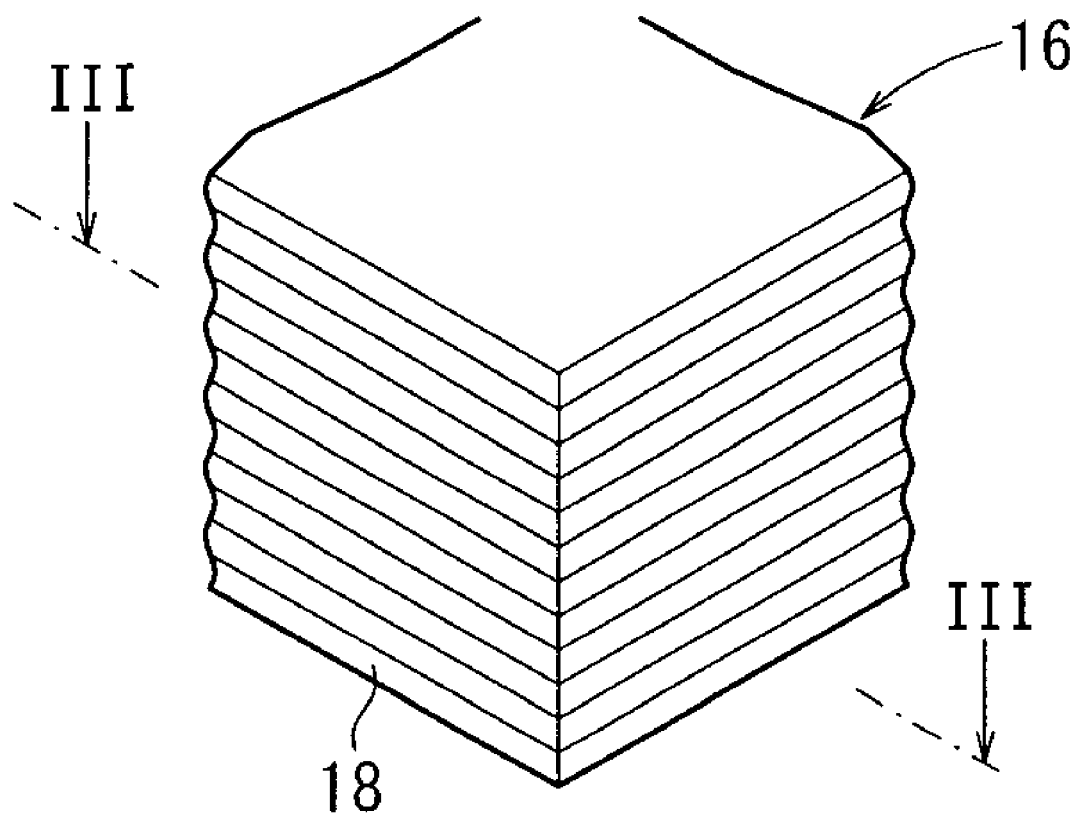
FIG. 2 is an enlarged fragmentary cross-sectional view of a metal belt stack.
Figure 3:
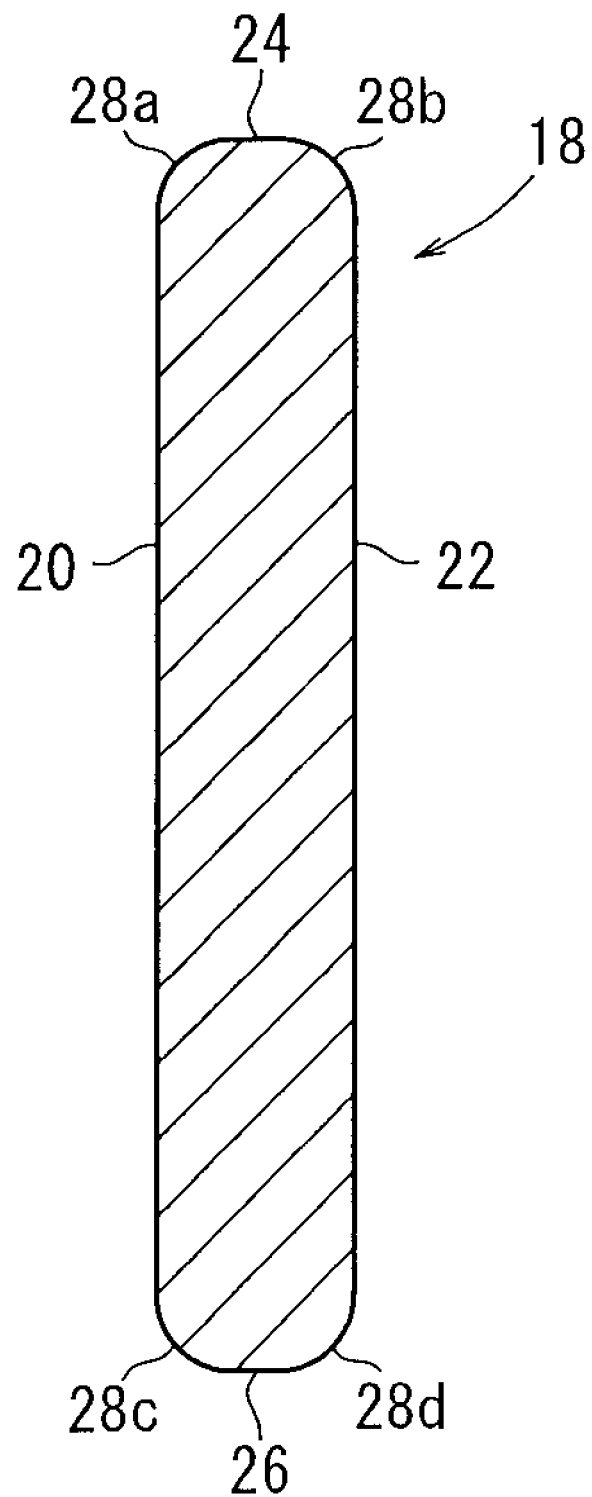
FIG. 3 is a transverse cross-sectional view taken along line III-III of FIG. 2, showing a single metal belt of the metal belt stack.

As shown in FIG. 2, each of the left and right endless metal belt stacks 16 comprises a stack of thin metal belts 18. All of the thin metal belts 18 are identical in structure. FIG. 3 shows one of the thin metal belts 18 in transverse cross section. The metal belt 18 comprises a flat inner portion 20 facing an inner circumferential side of the metal belt assembly 10, a flat outer portion 22 facing an outer circumferential side of the metal belt assembly 10, a pair of flat side portions 24, 26 on respective opposite sides of the metal belt assembly 10, and curved portions 28a through 28d, which are disposed respectively between the flat inner portion 20 and the flat side portion 24, between the flat side portion 24 and the flat outer portion 22, between the flat inner portion 20 and the flat side portion 26, and between the flat side portion 26 and the flat outer portion 22. The flat side portions 24, 26 and the curved portions 28a through 28d jointly define curved side portions of the metal belt 18.

Figure 4:
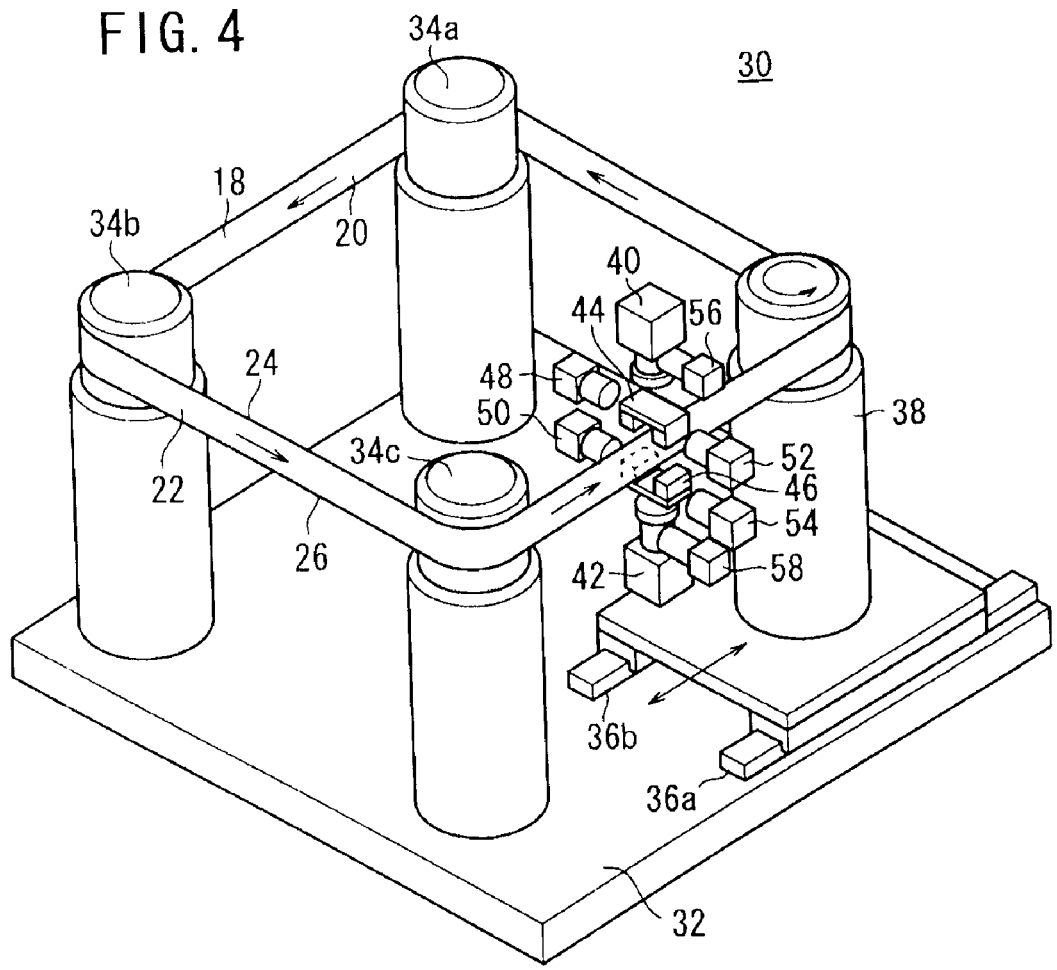
FIG. 4 is a perspective view of a belt inspecting apparatus according to a first embodiment of the present invention.

FIG. 4 shows in perspective a belt inspecting apparatus 30 according to a first embodiment of the present invention, which is utilized for inspecting the surface state of the metal belt 18 shown in FIG. 3.

The belt inspecting apparatus 30 comprises a base 32, three free rollers 34a through 34c mounted on the base 32, and a drive roller 38 movable in the directions indicated by the arrows on a pair of guide rails 36a, 36b mounted on the base 32. The metal belt 18 to be inspected is trained around the free rollers 34a through 34c and the drive roller 38.

Between the free roller 34c and the drive roller 38, there are disposed a color camera 40 (light detector) for detecting light reflected from one side of the metal belt 18, a color camera 42 (light detector) for detecting light reflected from the other side of the metal belt 18, and light guides 44, 46 for guiding illuminating light beams to the color cameras 40, 42.

The belt inspecting apparatus 30 also includes a pair of blue light sources 48, 50 (first light sources) disposed in facing relation to the flat inner portion 20 of the metal belt 18 for illuminating the flat inner portion 20 with blue (B) illuminating light beams (first illuminating light beams), and a pair of red light sources 52, 54 (second light sources) disposed in facing relation to the flat outer portion 22 of the metal belt 18 for illuminating the flat outer portion 22 with red (R) illuminating light beams (second illuminating light beams). The color cameras 40, 42 are combined with respective green light sources 56, 58 (third light sources) for illuminating the curved side portions of the metal belt 18 with green (G) illuminating light beams (third illuminating light beams). Beam splitters 57, 59 (see FIG. 6) are disposed between the color cameras 40, 42 and the green light sources 56, 58 for guiding the illuminating light beams from the green light sources 56, 58 to the light guides 44, 46, and also for guiding the illuminating light beams from the light guides 44, 46 to the color cameras 40, 42.

Figure 5:
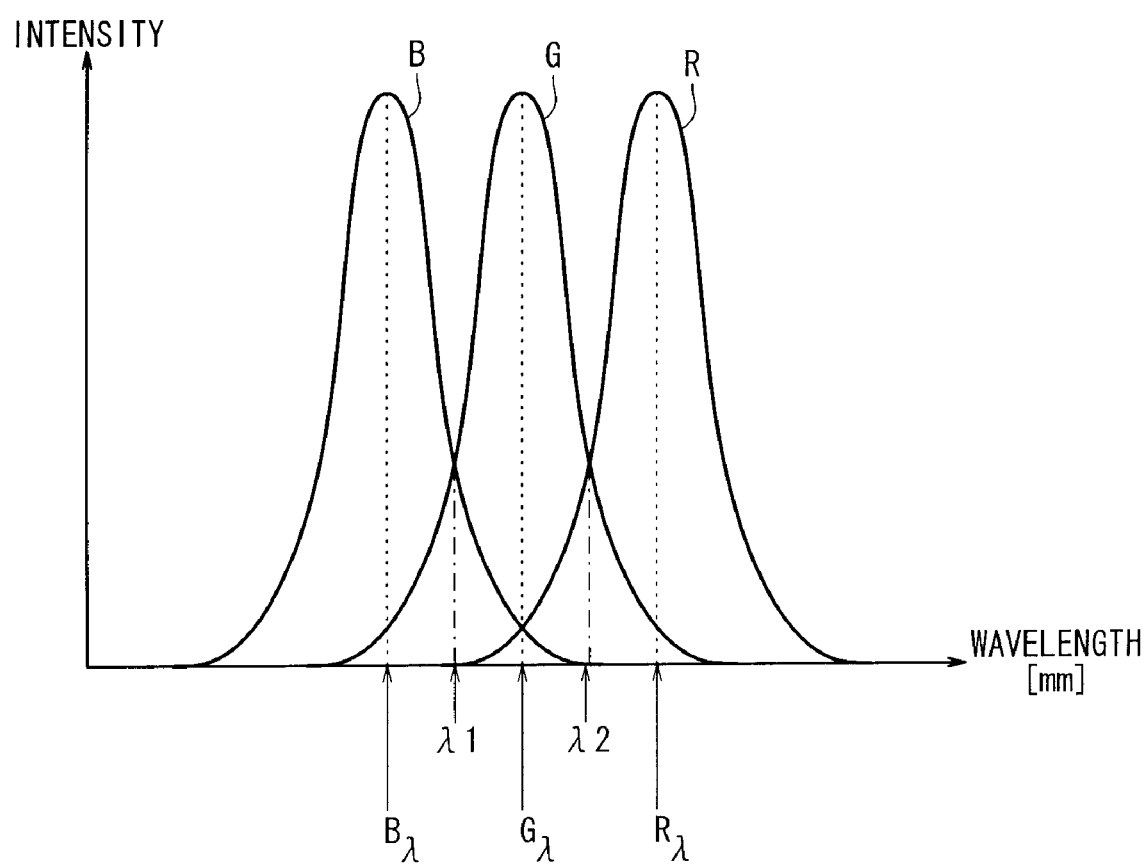
FIG. 5 is a diagram showing the wavelengths of illuminating light beams output from light sources of the belt inspecting apparatus according to the first embodiment.
Figure 6:
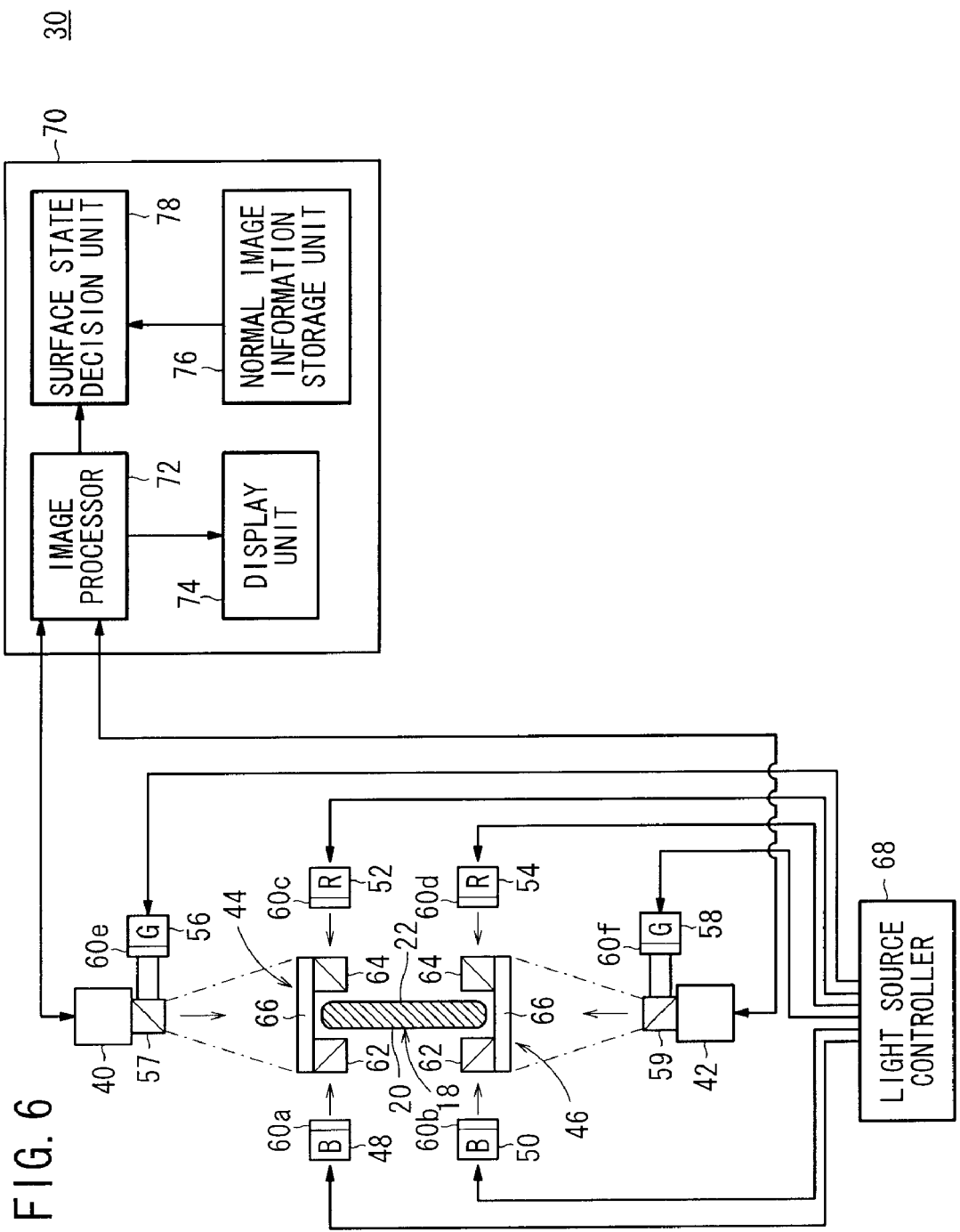
FIG. 6 is a block diagram of a control circuit of the belt inspecting apparatus according to the first embodiment.

The blue light sources 48, 50, the red light sources 52, 54, and the green light sources 56, 58 comprise respective light-emitting diodes (LEDs). As shown in FIG. 5, the LEDs output respective illuminating light beams within certain overlapping wavelength ranges, having respective central wavelengths B$\lambda$, G$\lambda$, R$\lambda$. Therefore, as shown in FIG. 6, the blue light sources 48, 50, the red light sources 52, 54, and the green light sources 56, 58 preferably are combined with respective cutoff filters 60a through 60f, for cutting off light within the overlapping portions of the wavelength ranges. Specifically, the cutoff filters 60a, 60b combined with the blue light sources 48, 50 cut off light whose wavelength is higher than a wavelength $\lambda1$ within the overlapping portion of the wavelength ranges of the blue light sources 48, 50 and the green light sources 56, 58. The cutoff filters 60c, 60d combined with the red light sources 52, 54 cut off light whose wavelength is lower than a wavelength $\lambda2$ within the overlapping portion of the wavelength ranges of the red light sources 52, 54 and the green light sources 56, 58. The cutoff filters 60e, 60f combined with the green light sources 56, 58 cut off light whose wavelength is lower than the wavelength $\lambda1$ within the overlapping portion of the wavelength ranges of the green light sources 56, 58 and the blue light sources 48, 50, and also cut off light whose wavelength is higher than the wavelength $\lambda2$ in the overlapping portion of the wavelength ranges of the green light sources 56, 58 and the red light sources 52, 54.

Figure 7:
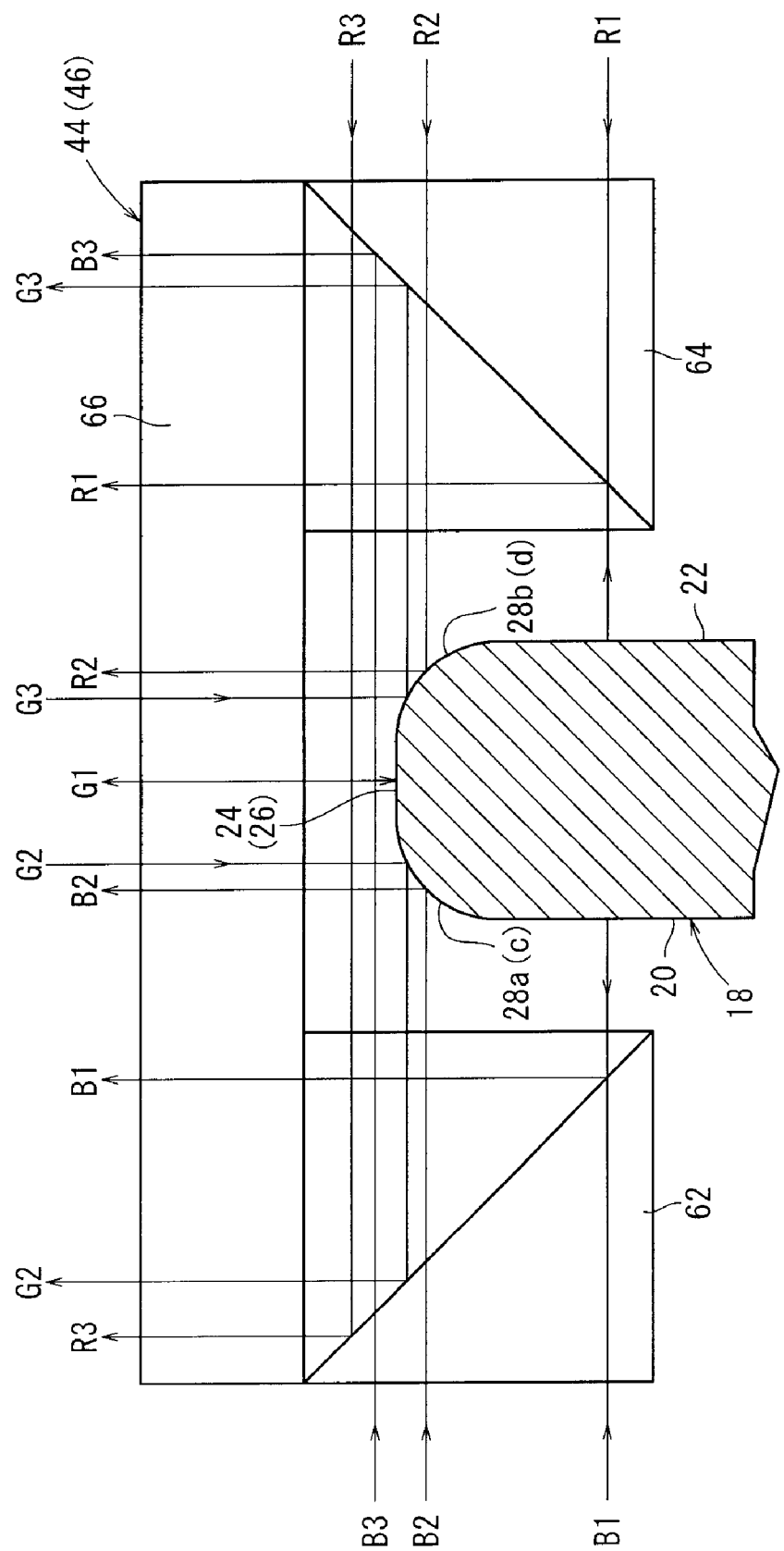
FIG. 7 is a view of light guides of the belt inspecting apparatus according to the first embodiment.

As shown in FIGS. 6 and 7, the light guides 44, 46 comprise respective beam splitters 62 (first optical members) for guiding the illuminating light beams output from the blue light sources 48, 50 to the flat inner portion of the metal belt 18 and also guiding the illuminating light beams reflected by the flat inner portion 20 to the color cameras 40, 42, respective beam splitters 64 (second optical members) for guiding the illuminating light beams output from the red light sources 52, 54 to the flat outer portion 22 of the metal belt 18 and also guiding the illuminating light beams reflected by the flat outer portion 22 to the color cameras 40, 42, and respective translucent members 66 (third optical members) interconnecting the beam splitters 62, 64 for guiding the illuminating light beams output from the green light sources 56, 58 to the flat side portions 24, 26 of the metal belt 18 and also guiding the illuminating light beams reflected by the flat side portions 24, 26 and the curved portions 28a through 28d to the color cameras 40, 42.

FIG. 6 shows in block form a control circuit for the belt inspecting apparatus 30. The belt inspecting apparatus 30 comprises a light source controller 68 for controlling the blue light sources 48, 50, the red light sources 52, 54, and the green light sources 56, 58, and an information processor 70 for processing light information detected by the color cameras 40, 42.

The information processor 70 comprises an image processor 72 for processing image information of the metal belt 18, which is captured by the color cameras 40, 42, a display unit 74 for displaying an image of the metal belt 18 based on the processed image information, a normal image information storage unit 76 for storing image information of a metal belt 18 that is in a normal state, and a surface state decision unit 78 for determining the surface state of the metal belt 18 undergoing inspection.

Figure 8:
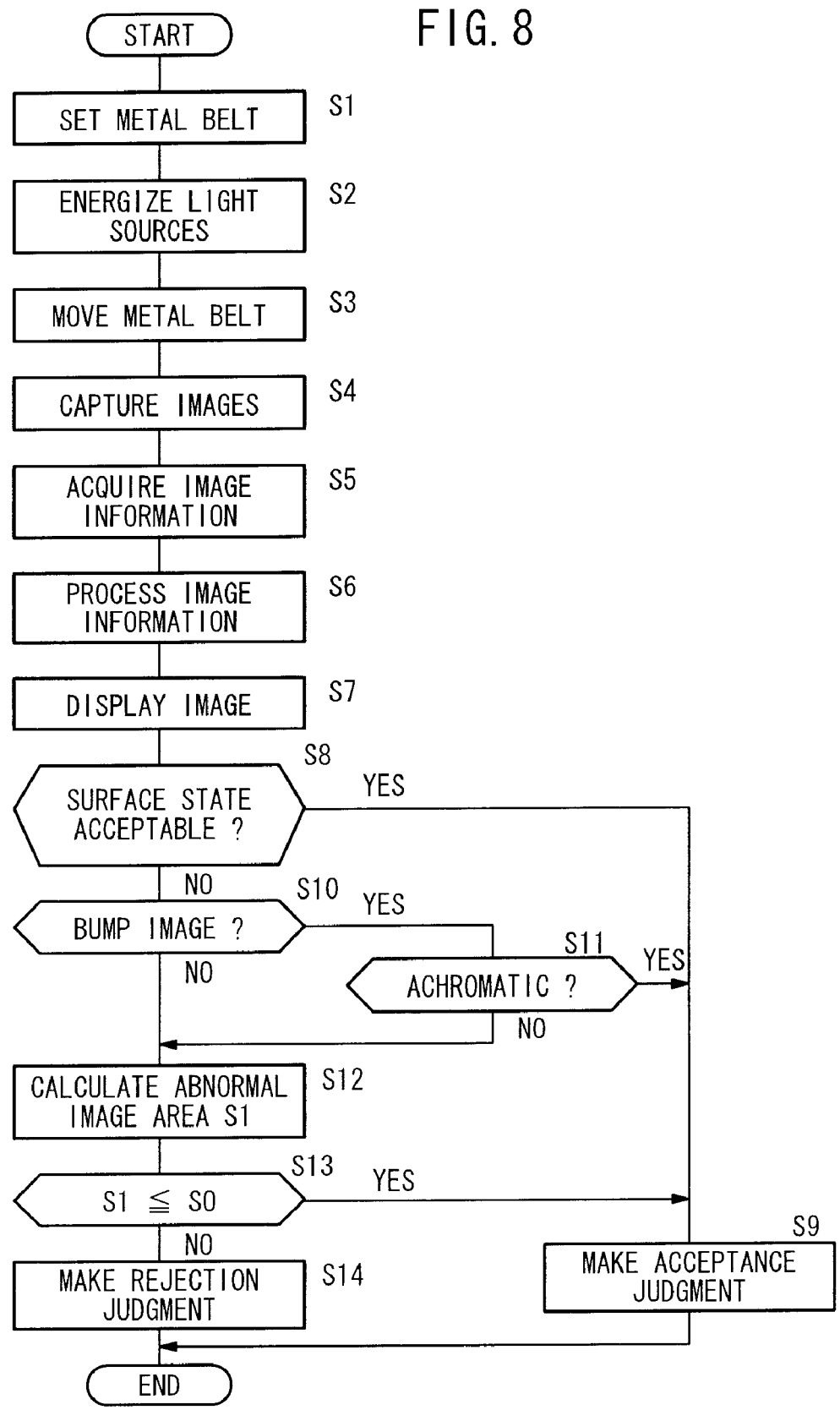
FIG. 8 is a flowchart of a processing sequence used in the belt inspecting apparatus according to the first embodiment.

The belt inspecting apparatus 30 according to the first embodiment basically is constructed as described above. Operations of the belt inspecting apparatus 30 shall be described below with reference to the flowchart shown in FIG. 8.

First, in step S1, the metal belt 18 is set in the belt inspecting apparatus 30 shown in FIG. 4. Specifically, the metal belt 18 is trained around the free rollers 34a through 34c and the drive roller 38, while the drive roller 38 is turned about its own axis in the direction indicated by the arrow (see FIG. 4) in order to apply a certain tension to the metal belt 18. The light guides 44, 46 are set in position with respect to opposite sides of the metal belt 18, as shown in FIG. 6.

Then, in step S2, the light source controller 68 is operated to energize the blue light sources 48, 50, the red light sources 52, 54, and the green light sources 56, 58, so as to apply illuminating light beams to the metal belt 18 through the light guides 44, 46. In step S3, the drive roller 38 is rotated about its own axis in order to move the metal belt 18, thereby enabling the belt inspecting apparatus 30 to begin inspecting the surface state of the metal belt 18.

As shown in FIG. 7, blue illuminating light beams B1 output from the blue light sources 48, 50 pass through the beam splitters 62, whereupon the blue illuminating light beams B1 are reflected by the flat inner portion 20 of the metal belt 18 and then reflected by the beam splitters 62, and are guided through the translucent members 66 to the color cameras 40, 42. Blue illuminating light beams B2 output from the blue light sources 48, 50 pass through the beam splitters 62, whereupon the blue illuminating light beams B2 are reflected by the curved portions 28a, 28c of the metal belt 18, and then are guided through the translucent members 66 to the color cameras 40, 42. Blue illuminating light beams B3 output from the blue light sources 48, 50 pass through the beam splitters 62, whereupon the blue illuminating light beams B3 travel off and past the metal belt 18 and then are reflected by the beam splitters 64, and are guided through the translucent members 66 to the color cameras 40, 42.

Red illuminating light beams R1 output from the red light sources 52, 54 pass through the beam splitters 64, whereupon the red illuminating light beams R1 are reflected by the flat outer portion 22 of the metal belt 18 and then reflected by the beam splitters 64, and are guided through the translucent members 66 to the color cameras 40, 42. Red illuminating light beams R2 output from the red light sources 52, 54 pass through the beam splitters 64, whereupon the red illuminating light beams R2 are reflected by the curved portions 28b, 28d of the metal belt 18, and then are guided through the translucent members 66 to the color cameras 40, 42. Red illuminating light beams R3 output from the red light sources 52, 54 pass through the beam splitters 64, whereupon the red illuminating light beams R3 travel off and past the metal belt 18 and then are reflected by the beam splitters 62, and are guided through the translucent members 66 to the color cameras 40, 42.

Green illuminating light beams G1 output from the green light sources 56, 58 pass through the translucent members 66, whereupon the green illuminating light beams G1 are reflected by the flat side portions 24, 26 of the metal belt 18, and then are guided through the translucent members 66 to the color cameras 40, 42. Green illuminating light beams G2 output from the green light sources 56, 58 pass through the translucent members 66, whereupon the green illuminating light beams G2 are reflected by the curved portions 28a, 28c of the metal belt 18 and then reflected by the beam splitters 62, and are guided through the translucent members 66 to the color cameras 40, 42. Green illuminating light beams G3 output from the green light sources 56, 58 pass through the translucent members 66, whereupon the green illuminating light beams G3 are reflected by the curved portions 28b, 28d of the metal belt 18 and then reflected by the beam splitters 64, and are guided through the translucent members 66 to the color cameras 40, 42.

In step S4, the color cameras 40, 42 detect the applied illuminating light beams so as to simultaneously capture images of the flat inner portion 20, the flat outer portion 22, the flat side portions 24, 26, and the curved portions 28a through 28d of the metal belt. In step S5, the information processor 70 acquires image information captured by the color cameras 40, 42. In step S6, the image processor 72 processes the acquired image information. In step S7, based on the processed image information, the display unit 74 displays an image of the metal belt 18. The operator can confirm the displayed image of the metal belt 18 in order to visually inspect the surface state of the metal belt 18.

Figure 9:
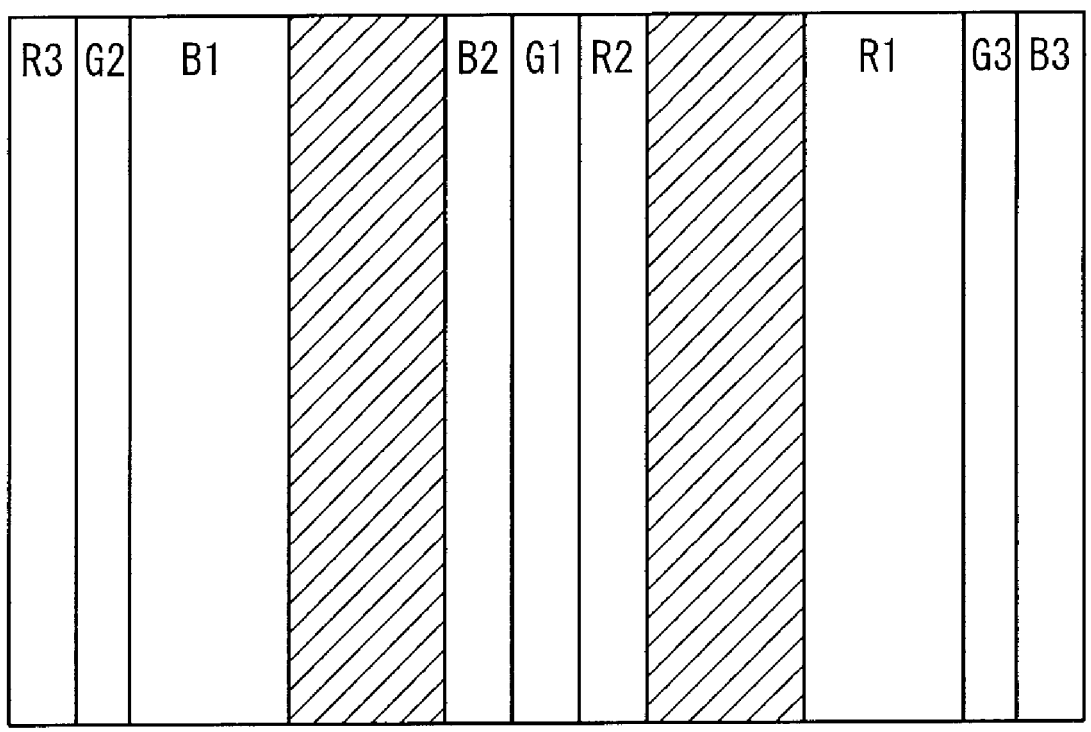
FIG. 9 is a view showing an image displayed when the surface of a metal belt, as inspected by the belt inspecting apparatus according to the first embodiment, is in a normal state.

FIG. 9 shows an image of a metal belt 18 having a normal surface state, wherein the metal belt 18 is free from dust particles and flaws. The image, which is displayed on the display unit 74, is made up of blue bands B1 through B3, red bands R1 through R3, and green bands G1 through G3, which are uniformly represented by the colors of the illuminating light beams B1 through B3, R1 through R3, and G1 through G3.

In step S8, the surface state decision unit 78 compares normal image information, which is read from the normal image information storage unit 76 and represents the normal state shown in FIG. 9, with the image information of the metal belt 18 that has been acquired from the color cameras 40, 42 and processed by the image processor 72, in order to determine whether the surface of the metal belt 18 is free of flaws and has an acceptable surface state. The surface state decision unit 78 can determine the surface state of the metal belt 18, for example, by calculating a differential value between the normal image information and the acquired image information, and comparing the differential value with a predetermined threshold value.

If the surface state decision unit 78 determines the surface state of the metal belt 18 to be acceptable, then the surface state decision unit 78 makes an acceptance judgement in step S9.

If the surface state decision unit 78 determines the surface state of the metal belt 18 to be unacceptable, then in step S10, the surface state decision unit 78 determines whether the image based on the acquired image information contains a bump image therein.

Figure 10:
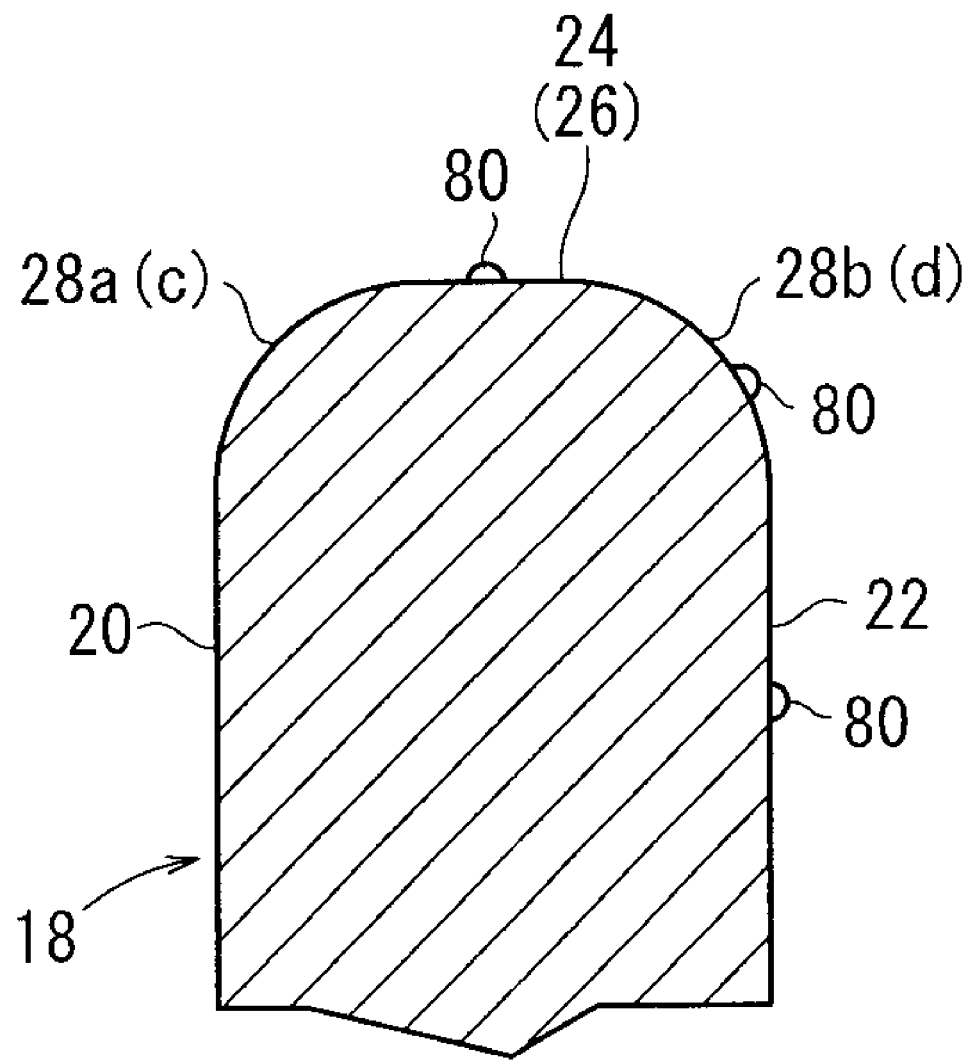
FIG. 10 is a fragmentary cross-sectional view showing bumps due to dust particles or flaws on the surface of a metal belt.
Figure 11:
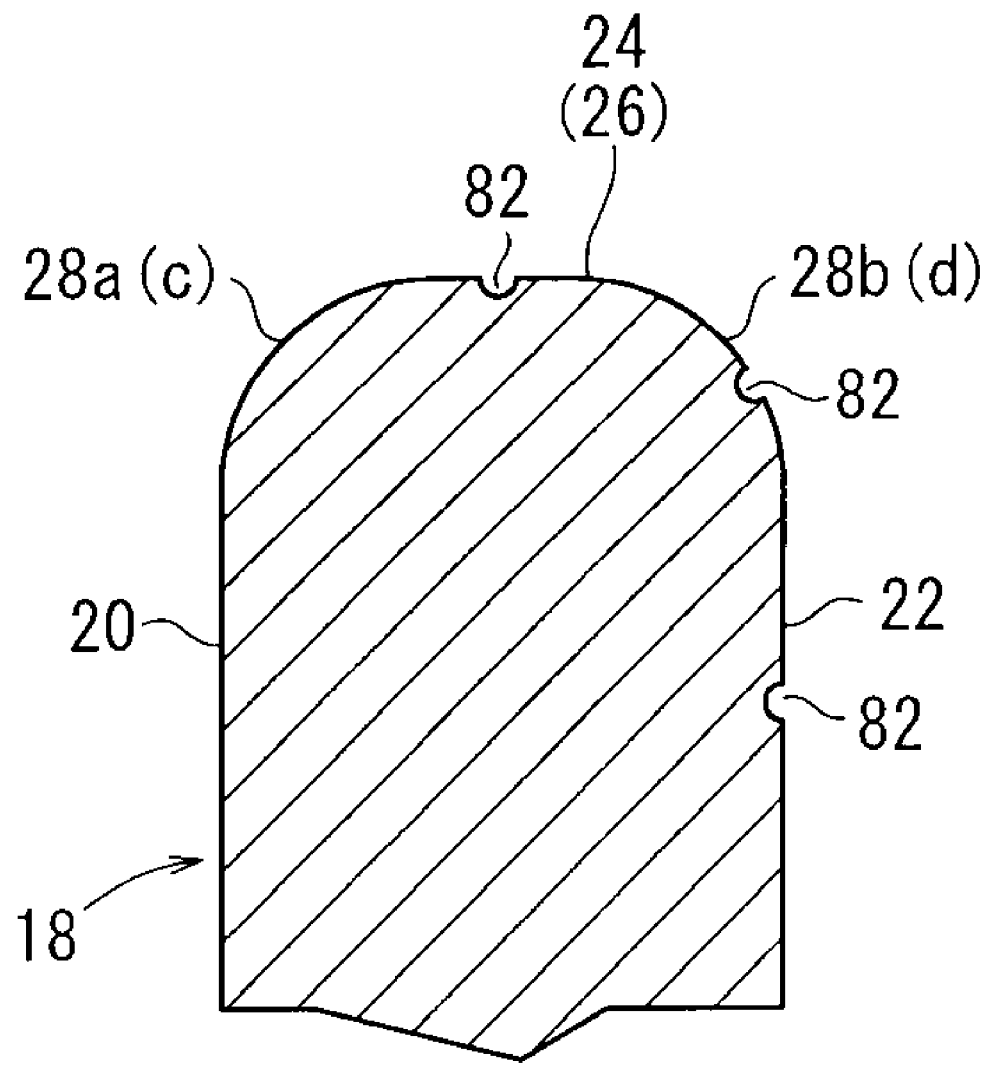
FIG. 11 is a fragmentary cross-sectional view showing recesses due to flaws on the surface of a metal belt.

FIG. 10 shows bumps 80 caused by dust particles or flaws on the surface of the metal belt 18. FIG. 11 shows recesses 82 caused by flaws on the surface of the metal belt 18. The recesses 82 are not formed by dust particles on the surface of the metal belt 18.

Figure 12:
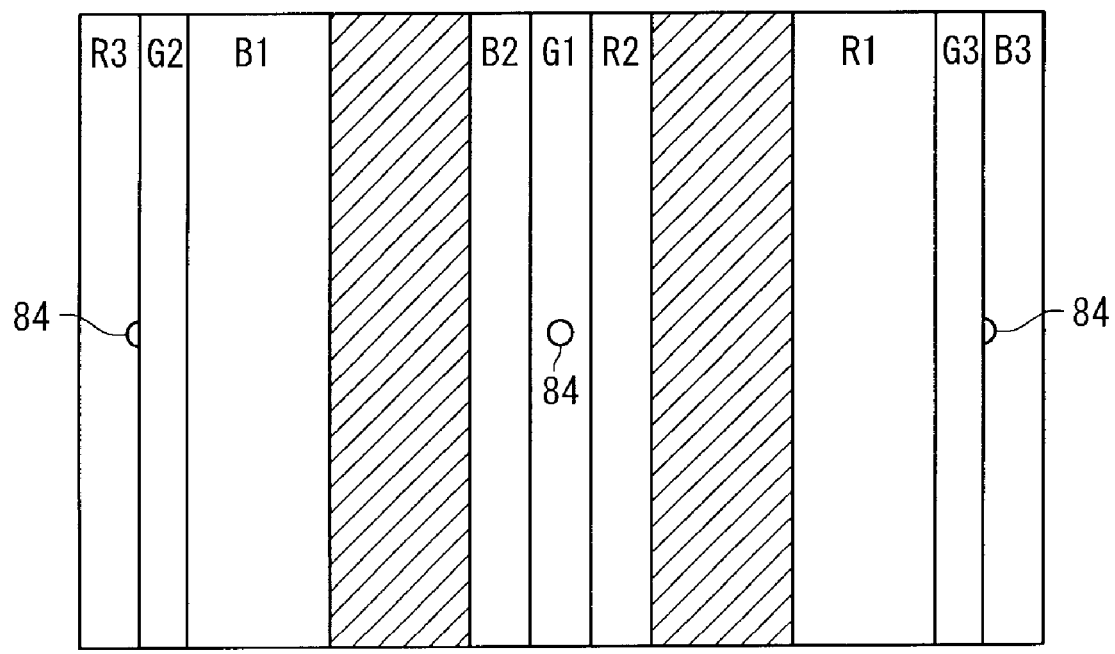
FIG. 12 is a view showing an image displayed when flat side portions of a metal belt, as inspected by the belt inspecting apparatus according to the first embodiment, have bumps thereon.
Figure 13:
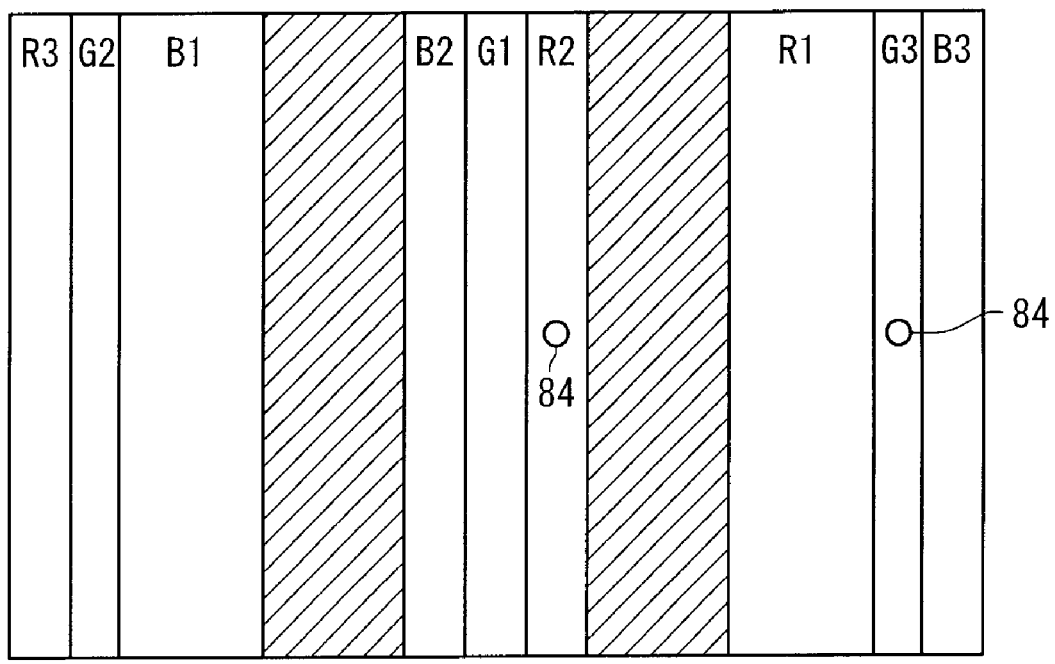
FIG. 13 is a view showing an image displayed when curved portions of a metal belt, as inspected by the belt inspecting apparatus according to the first embodiment, have bumps thereon.
Figure 14:
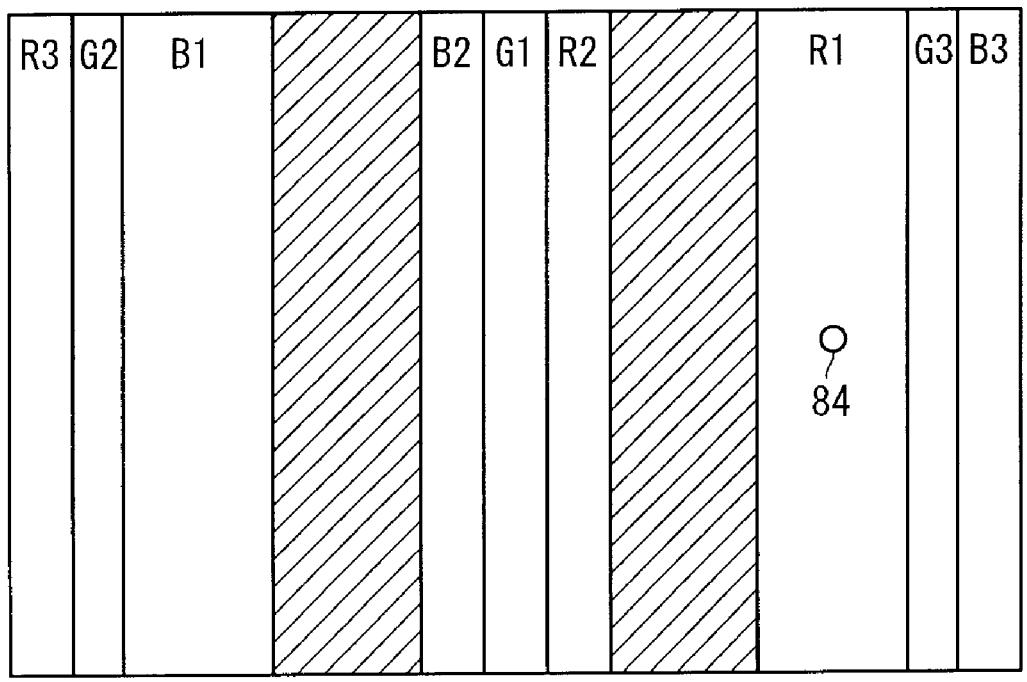
FIG. 14 is a view showing an image displayed when a flat outer portion of a metal belt, as inspected by the belt inspecting apparatus according to the first embodiment, has a bump thereon.

When a bump 80 is present on the flat side portions 24, 26 of the metal belt 18, bump images 84 appear in respective green, blue, and red bands G1, B3, R3 of the displayed image, wherein the bump images 84 are different from the surrounding images in color or light intensity, as shown in FIG. 12. When a bump 80 is present on the curved portions 28b, 28d of the metal belt 18, bump images 84 appear in the respective red and green bands R2, G3 of the displayed image, wherein the bump images 84 are different from the surrounding images in color or light intensity, as shown in FIG. 13. Similarly, when a bump 80 is present on the curved portions 28a, 28c of the metal belt 18, bump images 84 appear in the respective blue and green bands B2, G2 of the displayed image, wherein the bump images 84 are different from the surrounding images in color or light intensity. When a bump 80 is present in the flat outer portion 22 of the metal belt 18, a bump image 84 appears in the red band R1 of the displayed image, wherein the bump image 84 is different from the surrounding image in color or light intensity, as shown in FIG. 14. Similarly, when a bump 80 is present in the flat inner portion 20 of the metal belt 18, a bump image 84 appears in the blue band B1 of the displayed image, wherein the bump image 84 is different from the surrounding image in color or light intensity.

When a recess 82 is present on the flat side portions 24, 26 of the metal belt 18, no recess image appears within the blue and red bands B3, R3 shown in FIG. 12. Therefore, the operator can distinguish between the bump 80 and the recess 82, which are present on the flat side portions 24, 26. When recesses 82 are present on the flat inner portion 20, the flat outer portion 22, and the curved portions 28a through 28d of the metal belt 18, recess images, which are different from the surrounding images in color or light intensity, appear in a similar manner as the bump images 84 shown in FIGS. 13 and 14.

If the acquired image information contains a bump image 84 therein, then the surface state decision unit 78 determines whether the bump image 84 is chromatic or achromatic in step S11. If the bump 80 is a dust particle, then since the dust particle diffusely reflects all of the illuminating light beams B, R, G to the color cameras 40, 42, the bump image 84 is achromatic. By contrast, if the bump 80 is a flaw, then since it does not reflect some of the illuminating light beams B, R, G in certain directions, the bump image 84 is chromatic with a reduced light intensity. Therefore, it is possible to determine whether the bump 80 is a dust particle or a flaw, based on the color of the bump image 84. If it is judged that the bump 80 is a dust particle, then since the metal belt 18 can still be used as a flawless product, the surface state decision unit 78 makes an acceptance judgement in step S9.

If it is judged that the bump image 84 is chromatic in step S11, or if a recess image appears in the displayed image in step S10, then in step S12, the surface state decision unit 78 calculates the area S1 of an abnormal image, which is represented by the bump image 84 or the recess image, and then compares the calculated area S1 with a certain criterion S0 step S13. If S0=S0, then the surface state decision unit 78 makes an acceptance judgement in step S9. If S1>S0, then the surface state decision unit 78 makes a rejection judgement in step S14.

The information processor 70 can thus automatically inspect the surface state of the metal belt 18. Because the belt inspecting apparatus 30 can inspect the surface state of the metal belt 18, ranging from the flat inner portion 20 to the flat outer portion 22, using the color cameras 40, 42, the belt inspecting apparatus 30 is relatively simple in structure and inexpensive to manufacture.

Figure 15:
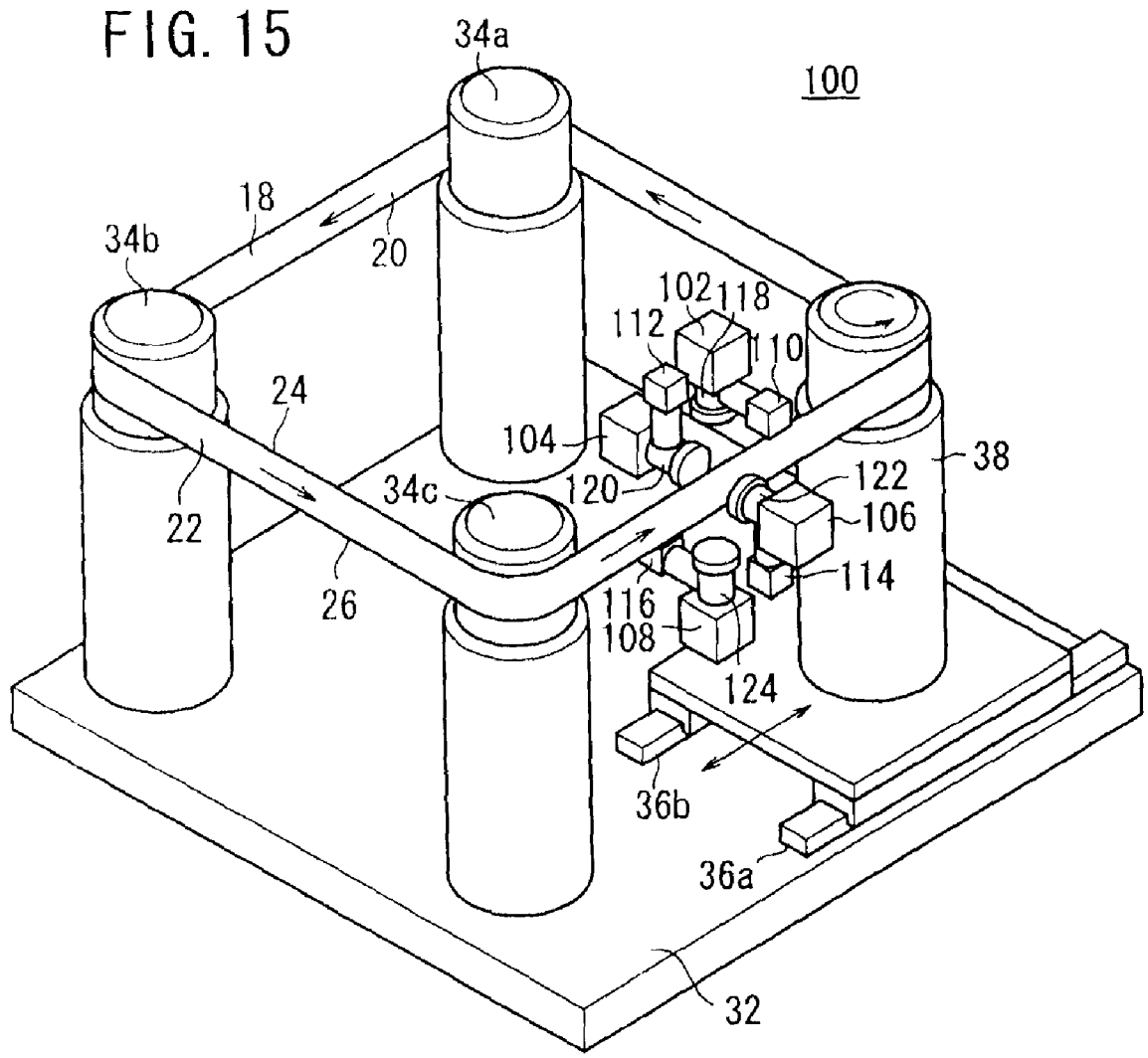
FIG. 15 is a perspective view of a belt inspecting apparatus according to a second embodiment of the present invention.

FIG. 15 shows in perspective a belt inspecting apparatus 100 according to a second embodiment of the present invention. Parts of the belt inspecting apparatus 100 that are identical to those of the belt inspecting apparatus 30 according to the first embodiment shown in FIG. 4 are denoted by identical reference characters, and such features will not be described in detail below.

Figure 16:
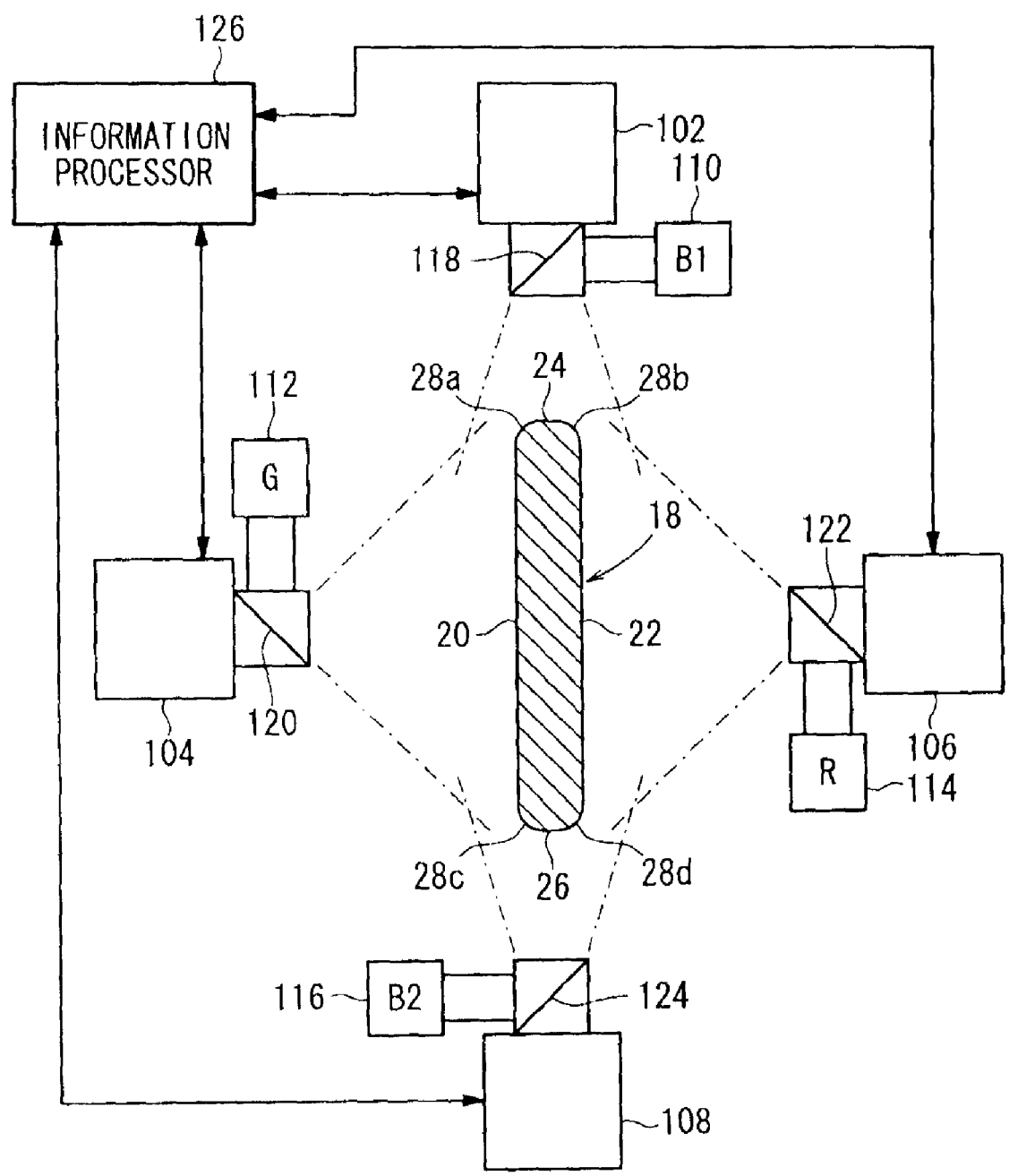
FIG. 16 is a schematic view of central components of the belt inspecting apparatus according to the second embodiment.

As shown in FIG. 15, the belt inspecting apparatus 100 includes a color camera 102 for detecting an illuminating light beam reflected from the flat side portion 24 of the metal belt 18, a color camera 104 for detecting an illuminating light beam reflected from the flat inner portion 20 of the metal belt 18, a color camera 106 for detecting an illuminating light beam reflected from the flat outer portion 22 of the metal belt 18, and a color camera 108 for detecting an illuminating light beam reflected from the flat side portion 26 of the metal belt 18. As shown in FIG. 16, the color cameras 102, 104, 106, 108 are each combined with respective light sources 110, 112, 114, 116, for illuminating the metal belt 18 with blue (B), green (G), and red (R) illuminating light beams. The color cameras 102, 104, 106, 108 preferably are combined with respective cutoff filters for separating the wavelength ranges of the illuminating light beams B, G, R. Beam splitters 118, 120, 122, 124 are disposed between the color cameras 102, 104, 106, 108 and the light sources 110, 112, 114, 116 for guiding the illuminating light beams from the light sources 110, 112, 114, 116 to the metal belt 18, as well as for guiding the illuminating light beams reflected by the metal belt 18 to the color cameras 102, 104, 106, 108. The image information of the metal belt 18, which is captured by the color cameras 102, 104, 106, 108, is processed by an information processor 126.

The belt inspecting apparatus 100 may comprise either two rollers, e.g., the drive roller 38 and the free roller 34c, for holding the metal belt 18 trained therearound, or three rollers, e.g., the drive roller 38 and the free rollers 34a, 34c, for holding the metal belt 18 trained therearound. The color cameras 102, 104, 106, 108 and the light sources 110, 112, 114, 116 may be integrally combined with each other, as shown, so as to be capable of being supported by a common support means. Alternatively, the color cameras 102, 104, 106, 108 and the light sources 110, 112, 114, 116 may be disposed separately from each other. If disposed separately from each other, the beam splitters 118, 120, 122, 124 may be dispensed with. Such an alternative structure may also be applied to the belt inspecting apparatus 30 according to the first embodiment.

The color camera 108 may or may not be combined with the light source 116. If the color camera 108 is combined with the light source 116, then the light source 116 should be made up of a light source for emitting an illuminating light beam B, which is the same as the illuminating light beam B emitted by the light source 110. The light source 116 for emitting the illuminating light beam B is advantageous in that the illuminating light beam B therefrom is different in color from the illuminating light beams G and R emitted from the adjacent light sources 112, 114.

Operation of the belt inspecting apparatus 100 according to the second embodiment will be described below.

Figure 17:
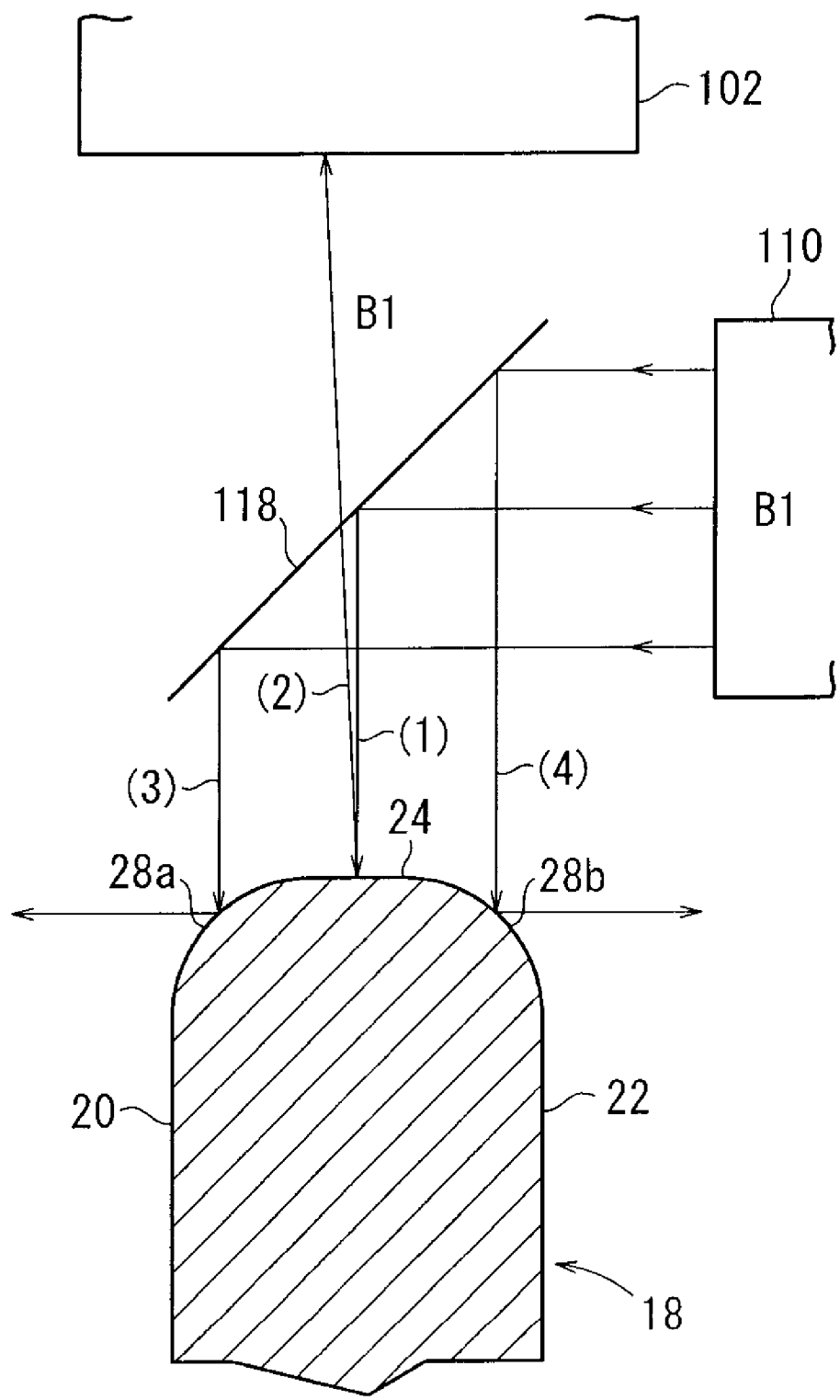
FIG. 17 is a view showing a light path of an illuminating light beam in the belt inspecting apparatus according to the second embodiment.
Figure 18:
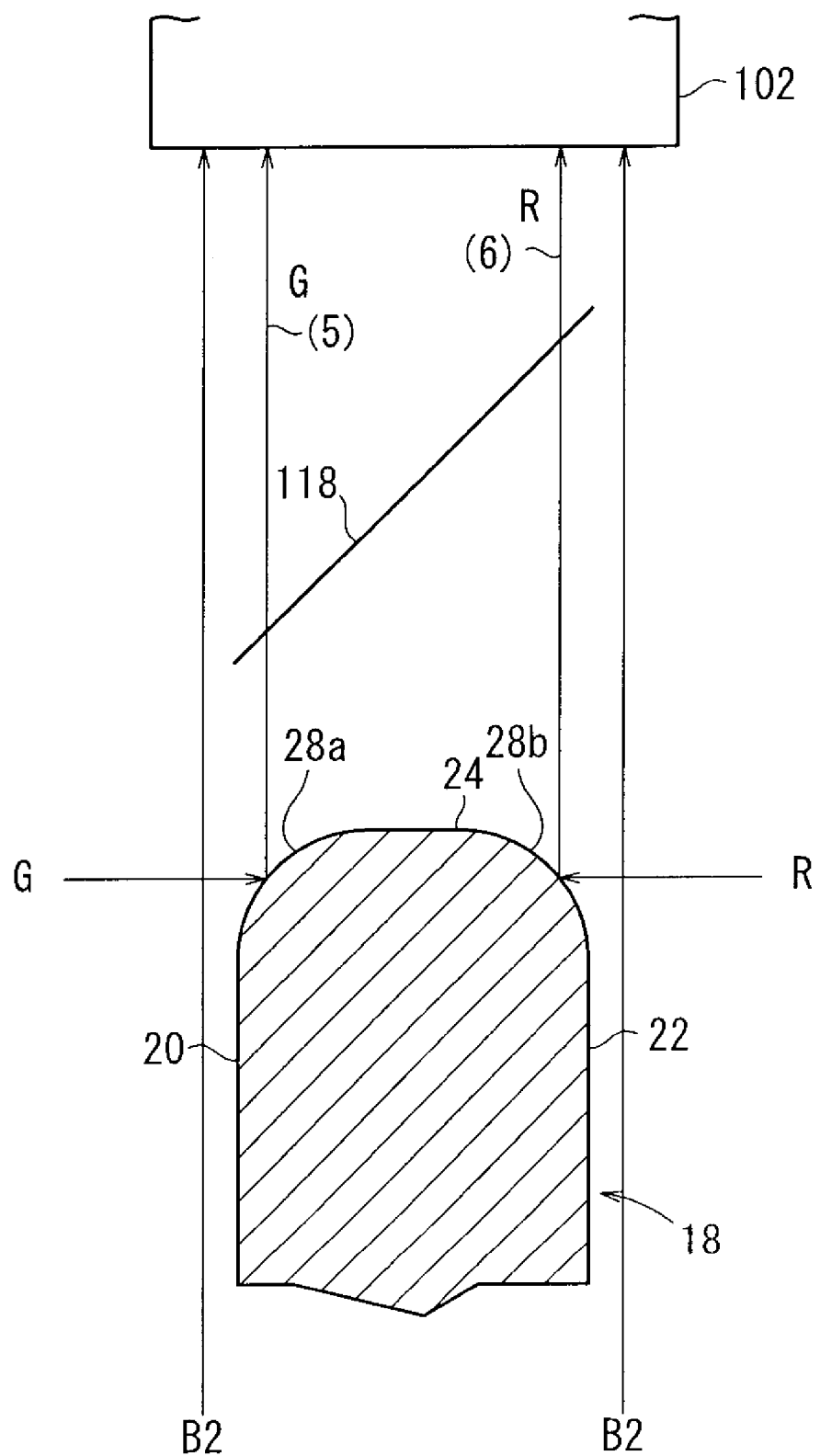
FIG. 18 is a view showing a light path of an illuminating light beam in the belt inspecting apparatus according to the second embodiment.

FIGS. 17 and 18 show the manner in which illuminating light beams are detected by the color camera 102. As shown in FIG. 17, the blue illuminating light beam B1 output from the light source 110 is reflected by the beam splitter 118, and applied to the flat side portion 24 of the metal belt 18 as indicated by (1). Then, the blue illuminating light beam B1 is reflected by the flat side portion 24 as indicated by (2), and guided to the color camera 102. The blue illuminating light beam B1 also is reflected by the beam splitter 118 and applied to the curved portions 28a, 28b of the metal belt 18, as indicated by (3), (4), and reflected thereby to the color cameras 104, 106, rather than to the color camera 102.

As shown in FIG. 18, the green illuminating light beam G output from the light source 112 and the red illuminating light beam R output from the light source 114 are reflected by the curved portions 28a, 28b, as indicated by (5), (6), and then guided to the color camera 102. The blue illuminating light beam B2 output from the light source 116 is directed in a straight line to the color camera 102.

Figure 19A:
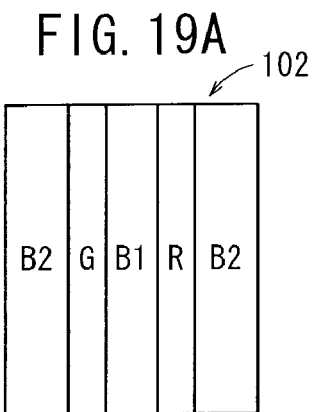
FIGS. 19A through 19D are views showing images displayed when the surface of a metal belt, as inspected by the belt inspecting apparatus according to the second embodiment, is in a normal state.
Figures 19B, 19C:
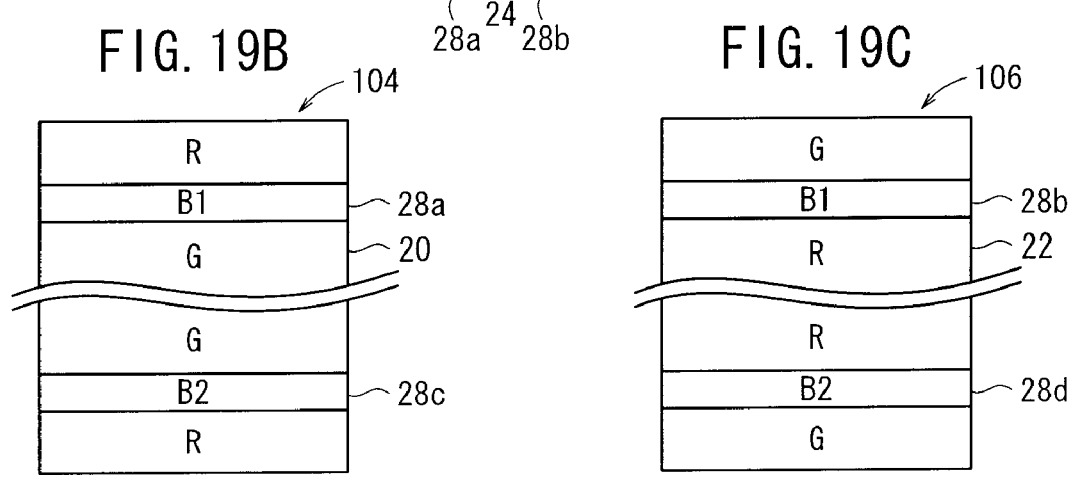
Figure 19D:
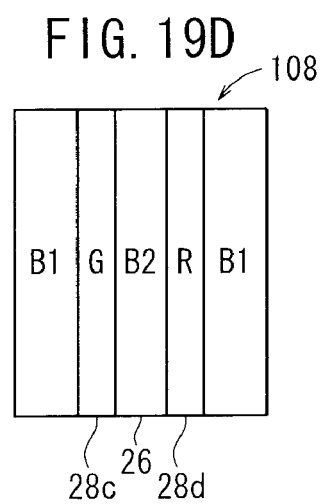

As a result, as shown in FIG. 19A, the image captured by the color camera 102 is made up of a central blue band B1 that represents the flat side portion 24, green and red bands G, R disposed on left and right sides of the central blue band B1 that represent the curved portions 28a, 28b, and blue bands B2 on outer sides of the green and red bands G, R. As shown in FIG. 19B, the image captured by the color camera 104 is made up of a central green band G that represents the flat inner portion 20, blue bands B1, B2 disposed on upper and lower sides of the central green band G that represent the curved portions 28a, 28b, and red bands R on outer sides of the blue bands B1, B2. As shown in FIG. 19C, the image captured by the color camera 106 is made up of a central red band R that represents the flat outer portion 22, blue bands B1, B2 disposed on upper and lower sides of the central red band R that represent the curved portions 28b, 28d, and green bands G on outer sides of the blue bands B1, B2. As shown in FIG. 19D, the image captured by the color camera 108 is made up of a central blue band B2 that represents the flat side portion 26, green and red bands G, R disposed on left and right sides of the central blue band B2 that represent the curved portions 28c, 28d, and blue bands B1 on outer sides of the green and red bands G, R. The aforementioned images are displayed on a display unit of the information processor 126.

Figure 20A:
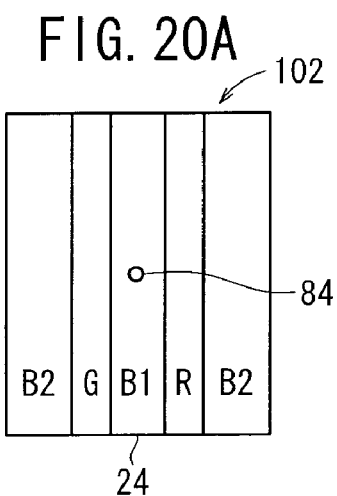
FIGS. 20A through 20C are views showing images displayed when a bump is present on a flat side portion of a metal belt, which is inspected by the belt inspecting apparatus according to the second embodiment.
Figure 20B:
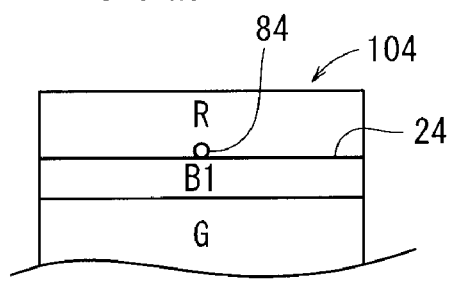
Figure 20C:
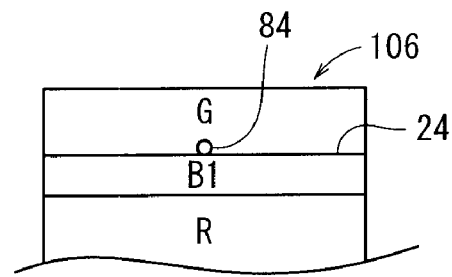

FIGS. 20A through 20C show images, which are displayed when a bump 80 (see FIG. 10) is present caused by a dust particle existing on the flat side portion 24 of the metal belt 18. Most of the dust particles are grayish white in color. When the bump 80 is illuminated with chromatic light, the bump 80 diffusely reflects the chromatic light, which does not reach the color cameras 102, 104. As shown in FIG. 20A, the image captured by the color camera 102 includes a grayish white bump image 84 within the blue band B1, which is representative of the flat side portion 24. As shown in FIG. 20B, the image captured by the color camera 104 includes a grayish white bump image 84 therein against a backdrop of the red band R above the band B1, which is representative of the flat side portion 24. As shown in FIG. 20C, the image captured by the color camera 106 includes a grayish white bump image 84 therein against a green band G above the band B1, which is representative of the flat side portion 24.

Figure 21A:
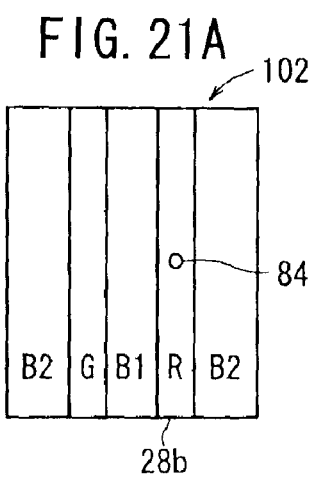
FIGS. 21A through 21C are views showing images displayed when a bump is present on a curved portion of a metal belt, which is inspected by the belt inspecting apparatus according to the second embodiment.
Figure 21B:
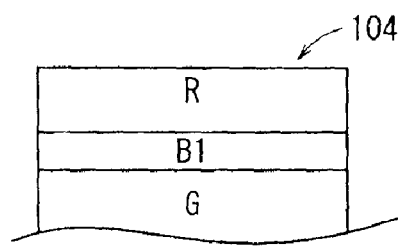
Figure 21C:
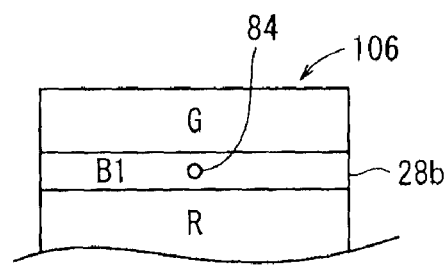

FIGS. 21A through 21C show images, which are displayed when a dust particle is applied to the curved portion 28b of the metal belt 18. As shown in FIG. 21A, the image captured by the color camera 102 includes a grayish white bump image 84 within the red band R that represents the curved portion 28b. As shown in FIG. 21B, the image captured by the color camera 104 does not include a bump image therein. As shown in FIG. 21C, the image captured by the color camera 106 includes a grayish white bump image 84 within the blue band B1 that represents the curved portion 28b.

Dust particles are bump-like objects, wherein the images produced thereby are grayish white. Since bump images 84 are clearly shown as achromatic images against a chromatic backdrop, the presence of dust particles can be detected with utmost ease.

Figure 22A:
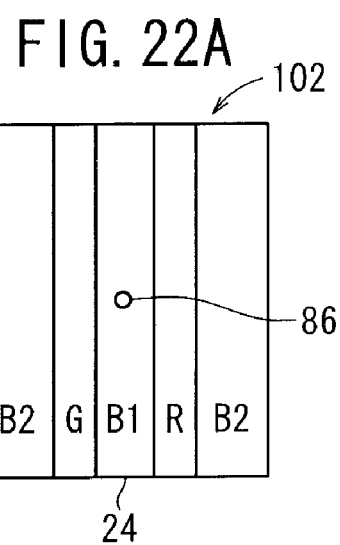
FIGS. 22A through 22C are views showing images displayed when a recess is present on a flat side portion of a metal belt, which is inspected by the belt inspecting apparatus according to the second embodiment.
Figure 22B:
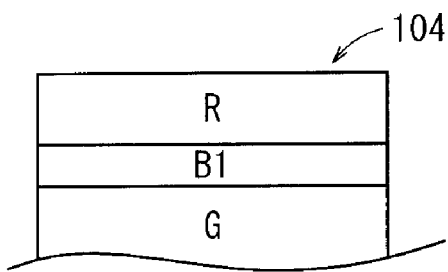
Figure 22C:
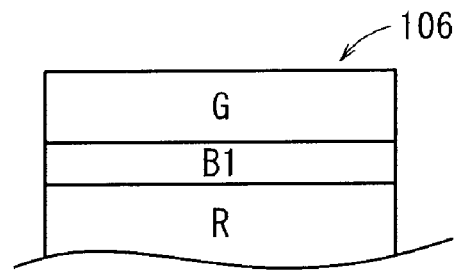

FIGS. 22A through 22C show images displayed when a recess 82 (see FIG. 11) is present, which is caused by a flaw on the flat side portion 24 of the metal belt 18. When chromatic light is applied to a flawed recess, since the chromatic light is reflected by the recess and reaches a color camera, a colored recess image 86 is included within the displayed image. Since a portion of the applied light reaches the color camera, the recess image 86 appears dark in color. As shown in FIG. 22A, the image captured by the color camera 102 includes a dark blue recess image 86 therein, which is representative of the flat side portion 24. In contrast, as shown in FIG. 22B, the image captured by the color camera 104 does not include an image therein, and as shown in FIG. 22C, the image captured by the color camera 106 also does not include an image therein. The images captured by the color cameras 104, 106 include no images therein, because the flaw is in the form of a recess.

Figure 23A:
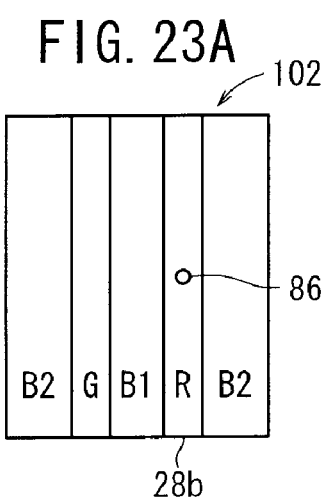
FIGS. 23A through 23C are views showing images displayed when a recess is present on a curved portion of a metal belt, which is inspected by the belt inspecting apparatus according to the second embodiment.
Figure 23B:
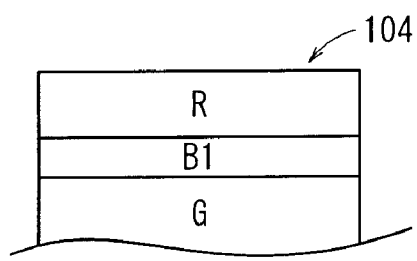
Figure 23C:
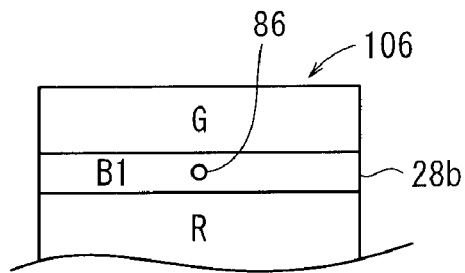
Figure 24A:
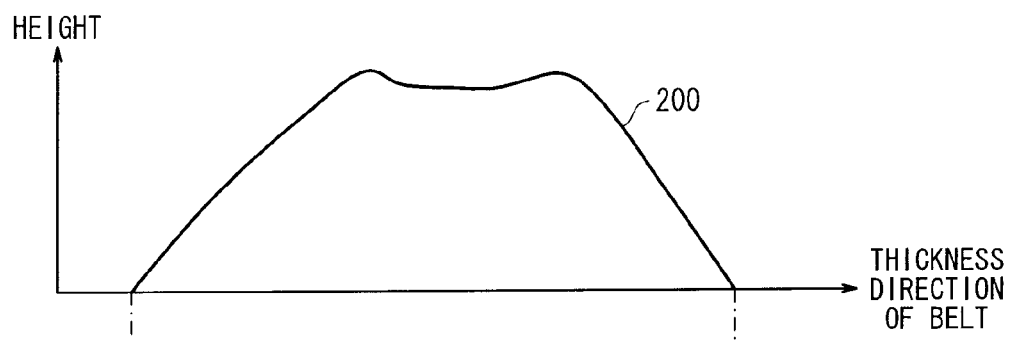
FIGS. 24A through 24C are diagrams showing both normal and abnormal profiles of transverse cross-sectional shapes of metal belts.
Figure 24B:
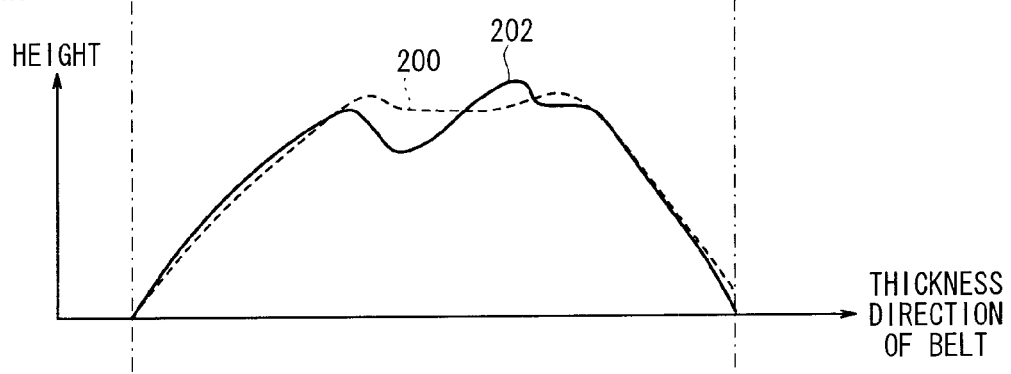
Figure 24C:
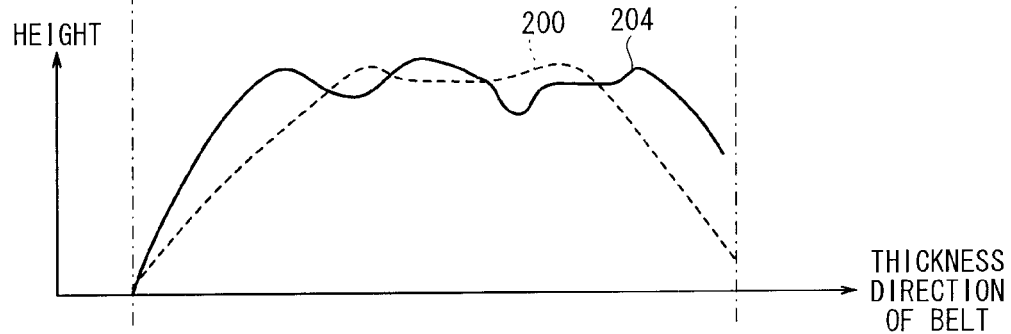

FIGS. 23A through 23C show images, which are displayed when a flaw, in the form of a recess, exists on the curved portion 28b of the metal belt 18. As shown in FIG. 23A, the image captured by the color camera 102 includes a recess image 86 within the red band R, which is representative of the curved portion 28b, wherein the recess image 86 includes a left half portion in dark red, and a right half portion in dark blue. As shown in FIG. 23B, the image captured by the color camera 104 does not include a recess image therein. As shown in FIG. 23C, the image captured by the color camera 106 includes a recess image 86 within the blue band B1, which is representative of the curved portion 28b, wherein the recess image 86 includes an upper half portion in dark blue, and a lower half portion in dark red. The flaw is displayed as a dark chromatic image.

Although the bump image 84 can basically be regarded as representing a dust particle, possibly the bump image 84 actually is a metal bump image, which represents a raised metal surface. However, since a metal bump image appears as a chromatic image, the metal bump image can easily be distinguished from an achromatic image representing a dust particle.

The present invention is not limited to the embodiments illustrated above, but various changes and modifications may be made without departing from the scope of the invention.

For example, among the blue illuminating light beam B, the red illuminating light beam R, and the green illuminating light beam G, which are used in the belt inspecting apparatus 30, the green illuminating light beam G may be replaced with an infrared illuminating beam. If an infrared illuminating beam is used instead of a green illuminating light beam G, then since the wavelength thereof differs greatly from the wavelengths of the blue illuminating light beam B and the red illuminating light beam R, dust particles and flaws can be detected with greater accuracy.

Furthermore, light beams having wavelengths other than the wavelengths of the blue illuminating light beam B, the red illuminating light beam R, and the green illuminating light beam G may be used, insofar as such wavelengths are capable of determining easily whether or not the metal belt 18 has flaws therein, depending on the material or other properties of the metal belt 18.

For example, illuminating light beams may be used having wavelengths, which make it possible to easily determine whether the metal belt 18 has flaws therein or not, depending on the surface hardness, the size of the flaws, etc., based on the material of the metal belt 18. Specifically, if the metal belt 18 has a relatively large surface hardness, or has a large flaw on the surface thereof, then an illuminating light beam having a short wavelength may be incapable of determining whether a small swell on the surface is a simple swell or a flaw, because such an illuminating light beam tends to detect swells as flaws. Therefore, in this case, an illuminating light beam having a relatively long wavelength preferably is utilized. On the other hand, if the metal belt 18 has a relatively small surface hardness, or has a small flaw on the surface thereof, then an illuminating light beam having a long wavelength may be incapable of detecting a flaw. In this case, an illuminating light beam having a relatively short wavelength preferably is utilized.

The belt inspecting apparatus 30 simultaneously inspects surface states of the metal belt 18 on both sides thereof, using the two color cameras 40, 42 and the two light guides 44, 46. However, the belt inspecting apparatus 30 may be configured to use only one color camera 40, and be operated such that after one side of the metal belt 18 is inspected using the color camera 40, the metal belt 18 is turned upside down, whereupon the other side of the metal belt 18 is inspected using the color camera 40.

The belt inspecting apparatus 100 may utilize three color cameras 102, 104, 106, wherein the belt inspecting apparatus 100 is operated such that, after one side of the metal belt 18 has been inspected using the color cameras 102, 104, 106, the metal belt 18 is turned upside down, whereupon the other side of the metal belt 18 is then inspected using the color cameras 102, 104, 106.

Thus modified, the belt inspecting apparatus requires more time to inspect the metal belt 18 than simultaneously inspecting both side portions of the metal belt 18. However, such a modified belt inspecting apparatus is simpler in structure, enables a greater layout freedom, and can be manufactured at a lower cost.

In the illustrated embodiments, the belt inspecting apparatus is used to inspect a metal belt 18 having flat side portions 24, 26. However, the present invention also is applicable to a belt inspecting apparatus for inspecting a metal belt that has curved portions 28a, 28b directly joined to each other and curved portions 28c, 28d directly joined to each other, and which is free of flat side portions 24, 26.

The metal belt 18 is not limited to an endless belt for use in CVTs, but may be applied to a filamentary belt having respective ends.

Although certain preferred embodiments of the present invention have been shown and described in detail, it should be understood that various changes and modifications may be made therein without departing from the scope of the appended claims.

What is claimed is:

1. An apparatus for inspecting a belt having a flat inner portion, a flat outer portion, and a curved side portion, the apparatus comprising:
   a first light source for outputting a first illuminating light beam to illuminate the flat inner portion of the belt, said flat inner portion of the belt being an inner peripheral end surface;
   a second light source for outputting a second illuminating light beam to illuminate the flat outer portion of the belt, said flat outer portion of the belt being an outer peripheral end surface;
   a third light source for outputting a third illuminating light beam to illuminate the curved side portion of the belt, said curved side portion being a side end surface that extends between the flat inner portion and the flat outer portion of the belt; and
   a light detector for detecting the first illuminating light beam, the second illuminating light beam, and the third illuminating light beam, that are reflected by the flat inner portion, the flat outer portion, and the curved side portion, respectively, to the light detector,
   wherein the first illuminating light beam, the second illuminating light beam, and the third illuminating light beam have different wavelengths, and surface states of the flat inner portion, the flat outer portion, and the curved side portion are inspected based on light information detected by the light detector.

2. An apparatus according to claim 1, further comprising:
   a first optical member for guiding the first illuminating light beam to the flat inner portion and guiding the first illuminating light beam reflected by the flat inner portion to the light detector;
   a second optical member for guiding the second illuminating light beam to the flat outer portion and guiding the second illuminating light beam reflected by the flat outer portion to the light detector; and
   a third optical member for guiding the third illuminating light beam to the curved side portion and guiding the third illuminating light beam reflected by the curved side portion to the light detector.

3. An apparatus according to claim 1, wherein the first illuminating light beam, the second illuminating light beam, and the third illuminating light beam comprise a blue light beam, a red light beam, and a green light beam.

4. An apparatus according to claim 1, wherein the first illuminating light beam, the second illuminating light beam, and the third illuminating light beam comprise a blue light beam, a red light beam, and an infrared light beam.

5. An apparatus according to claim 1, further comprising a surface state decision unit for processing the light information detected by the light detector in order to determine the surface states.

6. An apparatus according to claim 5, wherein the surface state decision unit determines the surface states by comparing image information represented by the light information with normal image information representing the surface states when the surface states are normal.

7. An apparatus according to claim 5, wherein the surface state decision unit determines the surface states based on whether image information represented by the light information is chromatic or achromatic.

8. An apparatus according to claim 1, further comprising a display unit for displaying an image based on the light information detected by the light detector.

9. An apparatus according to claim 1, further comprising a belt moving mechanism for moving the belt.

10. An apparatus according to claim 2, wherein the first optical member and the second optical member comprise respective beam splitters for guiding the first illuminating light beam and the second illuminating light beam to the light detector.

* * * * *